US008046375B2

(12) United States Patent
Quince

(10) Patent No.: US 8,046,375 B2
(45) Date of Patent: Oct. 25, 2011

(54) GEO TARGETED COMMERCE

(75) Inventor: Steven Quince, Tyngsboro, MA (US)

(73) Assignee: Lycos, Inc., Waltham, MA (US)

( * ) Notice: Subject to any disclaimer, the term of this patent is extended or adjusted under 35 U.S.C. 154(b) by 63 days.

(21) Appl. No.: 11/153,980

(22) Filed: Jun. 16, 2005

(65) Prior Publication Data

US 2006/0287995 A1 Dec. 21, 2006

(51) Int. Cl.
*G06F 17/30* (2006.01)
(52) U.S. Cl. ........................................ 707/759; 707/736
(58) Field of Classification Search ........................ None
See application file for complete search history.

(56) References Cited

U.S. PATENT DOCUMENTS

| 6,119,101 A * | 9/2000 | Peckover ........................ 705/26 |
| 6,523,021 B1 * | 2/2003 | Monberg et al. .................. 707/2 |
| 6,587,838 B1 * | 7/2003 | Esposito et al. ................ 705/26 |
| 6,973,448 B1 * | 12/2005 | Monberg et al. .................. 707/1 |
| 2004/0039646 A1 * | 2/2004 | Hacker ............................ 705/22 |
| 2006/0080274 A1 * | 4/2006 | Mourad ........................... 707/1 |

* cited by examiner

*Primary Examiner* — Charles Rones
*Assistant Examiner* — Yuk Ting Choi
(74) *Attorney, Agent, or Firm* — Fish & Richardson P.C.

(57) ABSTRACT

A user query has values for attributes that specify features of a desired item is received and processed in a computer system in a network. A database is searched for an item having attribute values that satisfy at least a subset of the values for attributes from the user query. Once an item is found in the database, a location where the item will be supplied along with a set of suppliers for the item in proximity to the location is determined.

32 Claims, 7 Drawing Sheets

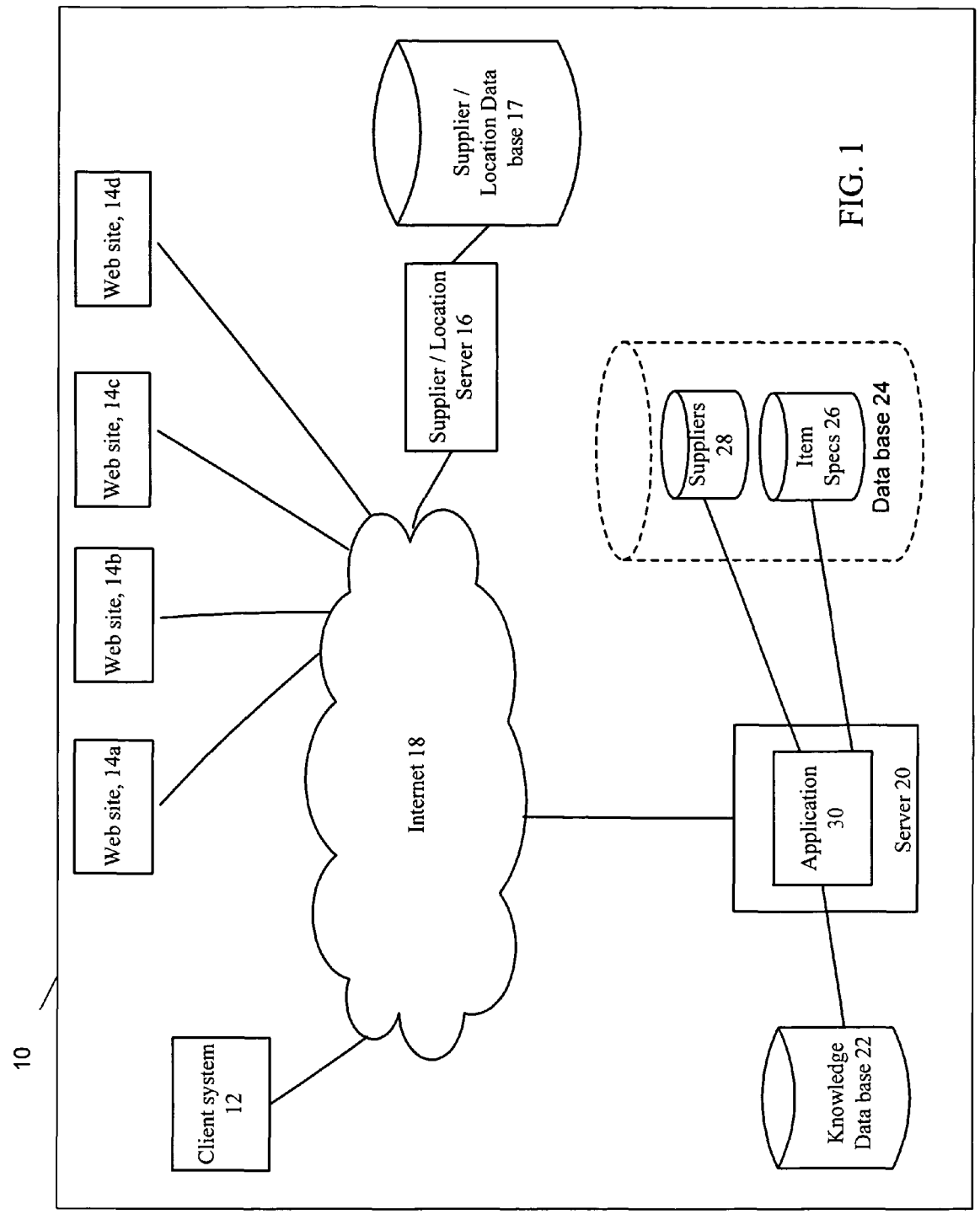

ITEM TYPE: 124

| Car | 126 |

120

SIZE:
124A

| Medium | 128A |

COLOR:
124B

| Red | 128B |

HORSE POWER:
124C

| 180 | 128C |

COMBUSTION:
124D

| Diesel | 128D |

TRACTION: 124E

| 4WD | 128E |

130

ZIP CODE:

| | 132 |

DISTANCE TO TRAVEL:

| 10 Miles | 134 |

PICK UP LOCATION:

| | 136 |

DELIVERY ADDRESS:

| | |
138

Check Availability:

[X]  140

Reserve::

| Car: 200 | |
|---|---|
| Size: | Medium |
| Color: | Red |
| HP: | 180 |
| Fuel: | Diesel |
| Traction: | 4WD |
| Zip code: | 01886 |
| Distance: | 10 miles |
| 204 | 206 |

| Car: 200 | |
|---|---|
| Size: | Medium |
| Color: | |
| HP: | 100 |
| Fuel: | |
| Traction: | 4WD |
| Zip code: | |
| Distance: | |
| 204 | 206 |

1, Ford Escort 2005 Red 170 HP $18,000 3 in stock Ford Nashua, Daniel Webster Hwy 12345

152 a

2, Toyota Corolla 2005 Red 170 HP $20,000 1 in stock Toyota of Manchester, Merimack Str 123

152 b

3, Volkswagen Jetta 2005 Red 180 HP $22,000 1 in stock VW Nashua, Daniel Webster Hwy 12346

GEO TARGETED COMMERCE

BACKGROUND

This invention relates to electronic based commerce.

So called "electronic commerce," also known as e-commerce, provides new selling tools, in the form of programs that run in networked computers that communicate via the Internet. The new electronic tools enable buyers to sit in front of a screen in order to participate in all phases of a purchase decision, rather than traveling to a physical store or using the phone and a physical catalog.

From a customer point of view, e-commerce provides virtual stores that help a user to search for a product, expedite payment and arrange for delivery. Efficiency is a feature of e-commerce that attracts many customers. From a merchant's point of view, the electronic-commerce system is a way to generate higher revenues. Despite these advantages of e-commerce, another segment of the buyer population prefers the touch and feel or face to face experience of traditional purchasing of items.

SUMMARY

In one aspect, the invention features a method, executed in a computer system, for processing a query received from a user. The query includes information that corresponds to values for a plurality of attributes that specify features of a desired item. A database is searched for an item with attribute values that satisfy at least a subset of the attribute values included in the user query. The method determines a location where the item will be supplied and a set of suppliers for the item in proximity to the location.

Implementations may include one or more of the following features. For example, the item may be a product or a service. The processing of the user query includes determining a preliminary item specification that includes attributes from the user query and searching the database for items that match attributes in the user query by the attributes in the preliminary item specification. If it is determined that a sufficient number of attributes have not been specified, a message is sent to the user to reformulate the query. The attributes from the user query include an item type. A local database and remote databases are searched. To determine if a sufficient number of attributes have been specified, a list of attributes of the item is determined. The list includes attributes of items that match attributes in the user query. A sufficient number of attributes have been specified if a majority of the attributes of the list of attributes of the item have been specified. A list of attributes of the desired item is determined by obtaining a plurality of item specifications, each one including an item type and a set of attributes of the item and combining the sets of attributes of the items into the list of attributes of the desired item. A desired item specification is determined by combining the desired item type, the list of attributes of the desired item and associated attribute values of the desired item.

The plurality of item specifications is obtained by searching local databases, remote databases and websites over the Internet. To determine the location where the item will be supplied may include obtaining a physical address from the user. The set of suppliers is determined by determining a set of desired items that correspond to the desired item specification and linking each desired item of the set of desired items with a supplier from a supplier database. The set of desired items is determined by searching a local database, a remote database and databases at remote partner sites over the Internet, for matching the desired item specification.

One or more aspects of the invention, may provide one or more of the following advantages.

One advantage of the invention is that it offers the buyer the benefits of e-commerce and of traditional commerce. The invention enables the buyer to research sources for a desired item by indicating the physical location where the item is available. Another advantage is that the invention helps the user to describe the desired product or service. The user may start a session with a simple, vague description of the desired item or by specifying uncommon features of the desired item. The invention researches the best available resources while guiding the user to describe the item comprehensively. Aspects of the invention, enables the user to quickly and easily locate suppliers of the desired item by employing specialized supplier databases maintained by providers who focus their activity on supplier research. As a result, the user is presented with a comprehensive list of suppliers of the items. The user is given the option to buy the desired product in a conveniently located store, where the product is available and may be reserved.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of an exemplary networked computer system architecture.

FIG. 4 is a diagram of a query GUI menu.

FIG. 5 is a diagram depicting exemplary item specifications.

FIG. 6 is diagram of a result page.

DETAILED DESCRIPTION

Figure 2A:
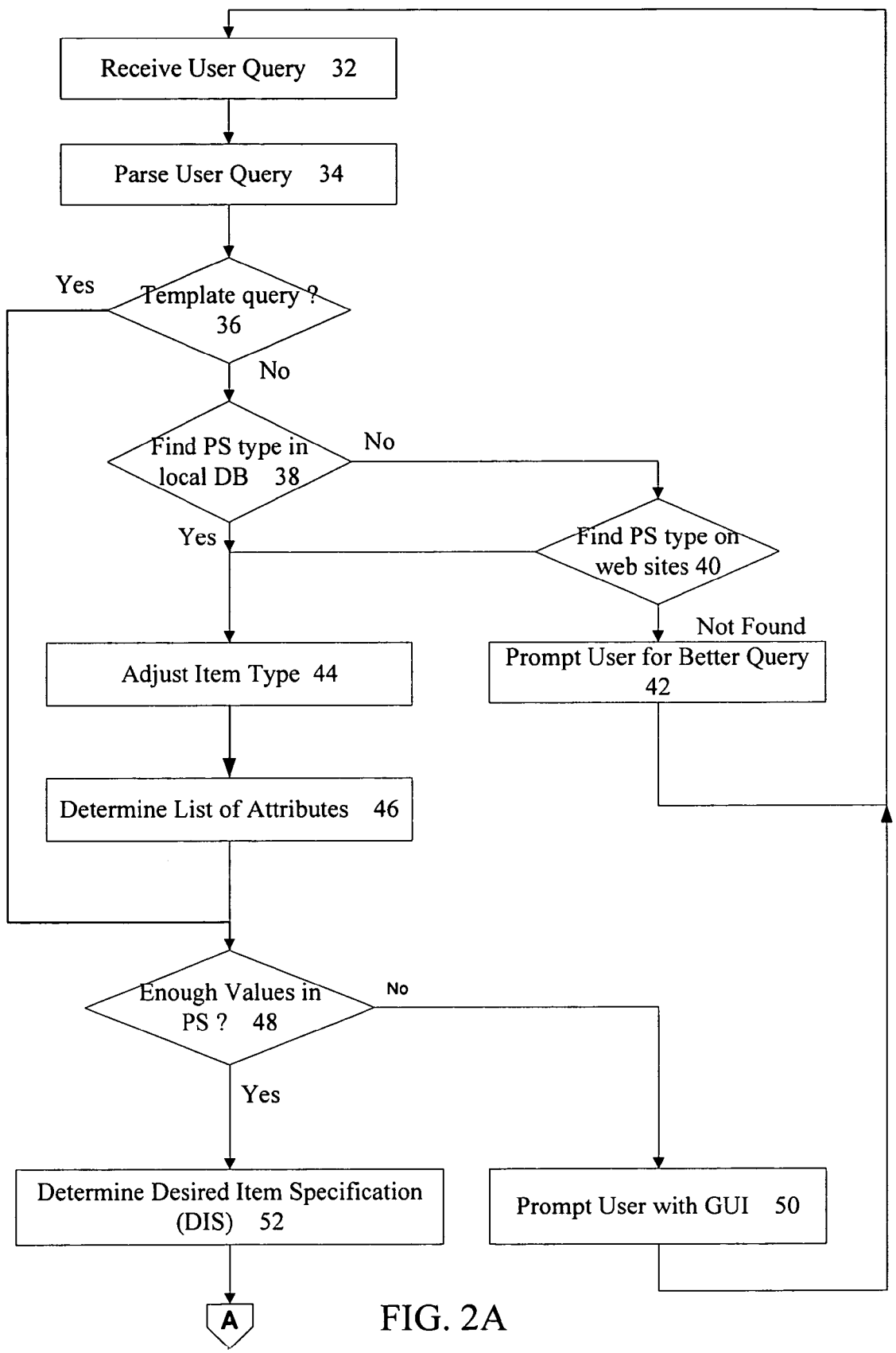
FIGS. 2A-2B are a flowchart depicting a process run on the network architecture of FIG. 1.

Referring to FIG. 1, a network computer system 10 supports an application 30 to locate a product or a service (referred to below as "item"). The network computer system 10 includes a client system 12 where a user requests services of the application 30 that executes on a server computer 20. The client 12 is connected to the server 20 by the Internet 18 or another network. The server 20 is connected to a local database 24 that includes a local supplier's database 28 and a local item specification database 26. The application 30 has local access to an item knowledge database 22. The application 30 may remotely access supplier/location databases 17 via associated suppliers/location server 16 and web sites 14, over the Internet 18. The databases can be implemented as relational databases or another database type. The user at the client system 12 formulates a user query for a desired item and sends the query to the server 20 for processing by application 30.

Figure 2B:
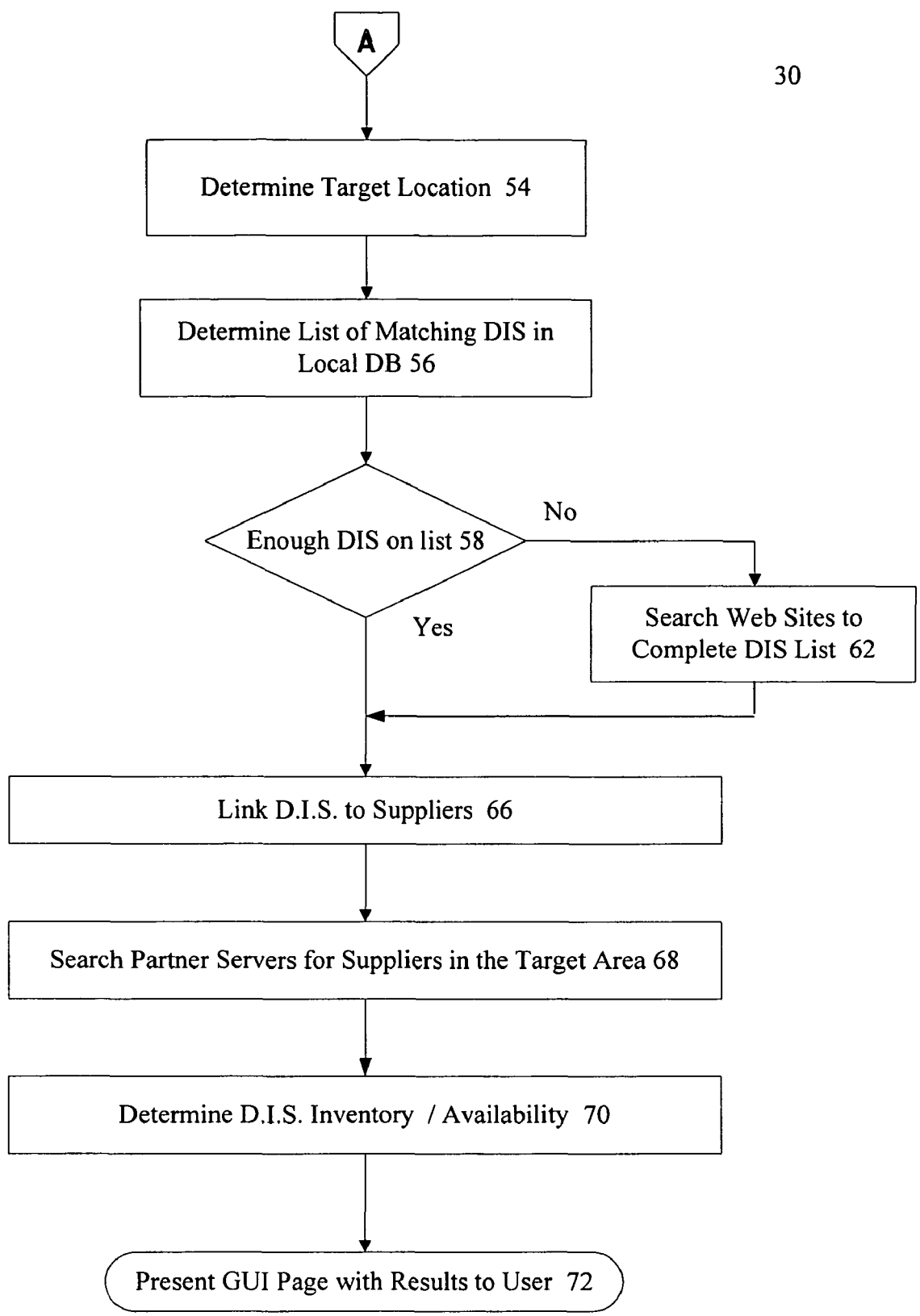

Referring to FIGS. 2A-2B, the application 30 receives 32 and parses 34 a user query that describes a specification of an item. An item specification (IS), described in detail below in FIG. 5, has an item type and a set of item attributes, where each attribute can have a value. In some implementations, the item type can be included as an attribute in the set of item attributes. Depending on whether the user query is from a template or other graphical user interface GUI (described below), or a descriptive text string, the application 30 decides 36 either to process the text string to provide a preliminary item specification PS, or to process fields in the template or GUI.

The application 30 uses the item specification (IS) from a text string query as a preliminary item specification PS that may need to be revised by adjusting 44 the item type and optionally adding 46 more attributes to the preliminary item specification (PS).

If the query is in the form of a text string, the application 30 searches 38 e.g., the local item specification database 26 (FIG. 1) for the item type in the preliminary item specification (PS). If the application 30 finds an item type in an item specification (IS) in the item specification database 26, the application 30 also retrieves a list of attributes for the item type.

If the preliminary item specification (PS) item type is not found in the item specification database 26, the application 30 searches other databases for item specifications (IS) that match the PS item type. The application 30 may search 40 remote web sites 14 for IS that match the PS item type, if no matching IS were found in the local item specification database 26. In some embodiments the search of the remote web sites 14 may be executed if less than a preconfigured number of matching IS, for example three, were found in the item specification database 26. The application 30 uses a search engine to search the remote web sites 14.

If no item specification (IS) matches are found on the remote web sites 14, the application 30 prompts 42 the user at the client system 12 to enter a new query. In alternative embodiments, the application 30 may prompt the user for a new query if the total number of matches found in the item specification database 26 and on the remote sites 14, is less than a preconfigured threshold value, for example, less than three matches.

As discussed above, when the application 30 finds a sufficient number of IS that match the PS item type, the application may adjust 44 the type of the item. For example, if the user query is a text string such as "vehicle, medium size, fast, with low gas consumption," the application 30 may adjust the type of the item to be a "car." This adjustment may result, for example, if a large number of the searched item specifications (IS) have attribute values that match the preliminary item specification PS attribute values and their item type is "car."

When the application 30 finds a sufficient number of item specifications IS that match the preliminary item specifications PS, the application 30 determines 46 a list of attributes that are associated with the desired item. The list of attributes of the desired item is generated by listing the attributes of all of the matched item specifications IS. The list of attributes of the desired item may be the result of searches (38) in the local database 26 as well as remote searches (40) of the web sites 14. A relatively large list of attributes of the desired item defines better what the desired item actually is. As explained, the application 30 is configured to search (38, 40) for a number of matches of the PS in the local database 26 and/or remote sites 14. Configuration of a relatively larger number of required matches provides a concomitant relatively large list of attributes that renders a better item definition. By searching remote sites 14, the application may list up attributes that are not supported in the local database 26, thus allowing the application 30 to search for attributes related to the latest item developments.

The application 30 may use a knowledge database for items 22 to add attributes to the list of attributes of certain desired items. The knowledge database 22 is a rule based database that stores knowledge about items and rules that connect well known items to well known attributes.

After having determined the list of attributes, the application 30 qualifies the PS by checking its attribute values. If the application 30 determines 48 that, for example, 75 percent of the attributes on the list of attributes of the desired item have specified values in the PS, the application 30 determines 52 that the PS specification qualifies as a desired item specification DIS meaning that the PS sufficiently describes the desired item.

In addition, the application 30 checks 48 the attribute values in the template or GUI user query. Initially, the template or GUI presents the user with a sufficient number of attributes for which the user fills in values. However, the user may neglect to fill in values for some of the presented attributes. One possible value for any attribute is "don't care." However, unless the user fills in a "don't care" (DC) value for an attribute, the application 30 will evaluate the entry as being incomplete. Thus, the application 30 guides the user to describe accurately the desired item, by distinguishing a specification that is intentionally sketchy from one that is poorly-defined because of the user negligence to enter attribute values.

If the application 30 determines 48 that there are not enough values in the preliminary item specification PS or a template or GUI, the application prompts 50 the user to provide a new query. The user is presented a GUI screen, or a hierarchy of GUI screens, similar to the screen shots depicted in FIG. 4, which display the entire list of attributes of the desired item. Thus, the application 30 guides the user to describe the desired item comprehensively. When the application 30 receives 32 the new user query from the user, the new query is expected to have specified all the attribute values, where some values may be "don't care" (DC).

When the application 30 receives 32 and parses 34 a user query that is checked 48 to have values for most of the attributes of the desired item attribute list, the application 30 determines 52 a desired item specification (DIS). The application 30 determines the DIS by putting together the desired item type, the list of attributes of the desired item and the values of the attributes. As explained above, in a DIS (shown in FIG. 5), most of the attributes have specified values After determining the DIS, the application 30 determines 54 the target location. The target location may or may not coincide with the location of the client system 12. The user may interact with the application 30 using a client system 12 at a location that is different from the location around which the user wants to locate the desired item.

The application 30 inserts the target location as an attribute on the list of attributes of the desired item and prompts the user for a target location in the initial template or GUI. If the user specifies a target location in the user query, the application 30 determines 54 the target location from the DIS.

The application 30 may determine the location of the user client system 12, by analyzing the Internet messages received from the client system 12. The Internet Protocol (IP) source addresses, present in IP packets, indicate the location of the client system 12. If the client system 12 is a mobile device, such as a wireless laptop PC, the application 30, interacts with components such as a Home Location Register in a wireless, cell based network, in order to determine the current location of the client system 12. If able to locate the physical location of the client system 12 and the user does not specify any target location in the user query, the application may infer that the target location is the location of the client system 12. Alternatively, the application may be configured to treat the absence of the target location information as criteria to prompt (42, 50) the user to specify the target location information.

Once the DIS, including the target location is determined, the application 30 matches 56 the DIS with item specifications stored in the item specification database 26 of the local database 24.

When the application 30 finds 56 matching IS in the local item specification database 26, it links 66 the matched IS to suppliers from the supplier databases 28. Thus, the application 30 produces 66 a list of links, each link connecting a matched IS from the item specification database 26 to an item supplier from the supplier database 28. It is important to notice that each matched IS is an instance of the desired item, which may differ slightly from the other matched IS, for example, reflecting that the DIS might have not had values specified for all the attributes. Thus, after linking 66 suppliers, the application has a list of "desired item—desired item supplier."

If the application 30 does not find or finds less than, for example three, IS that match the DIS in the local database 24, the application 30 searches 62 remote web sites 14. The remote search is expected to generate additional links of desired items to item suppliers.

The list of "desired item—desired item supplier" links generated by the application 30 may include desired items of different brand and each desired item brand may be linked to one or more suppliers. The suppliers may be retailers, manufacturers, local dealers, franchise dealers and so forth.

After generating the list of "desired item—desired item supplier" links, the application 30 searches 68, over the Internet 18, remote partner supplier/location servers 16 that access supplier/location databases 17. The partners maintain supplier/location databases 17 associated with servers 16 and render a reliable service by frequently entering new information and updating the old one. Such partnerships may be established under contract. Alternatively, the application 30 may use its search engines to explore either known supplier web sites or discover supplier, web supported databases. In all cases, the search for suppliers and their location is executed for an area determined by the target location In order to locate items efficiently, the application 30 maintains indexed lists of suppliers, supplier databases and web sites. The indexed lists of suppliers, supplier databases and web sites are continuously updated. The application 30 adds information on the lists when it finds useful information about the searched items. The application 30 removes off the lists information related to suppliers, databases and web sites that become unavailable or are not reliable. The indexed lists may direct the search to suppliers of the desired item to retrieve, information on the availability of the items. The indexed lists are also used to direct the search for supplier locations to remote partners known to own supplier databases that are well-maintained. Any time the application decides to search web sites 40, the indexed lists direct the search to web sites proved to be reliable by prior searches.

Optionally, the application 30 determines 70 the availability of the item at the target location. In this case, the application 30 searches for inventory information at each located supplier. As the result of the search 68, the application 30 produces and presents 72 the user a list of suppliers of the desired item that serve the area around the target location. If requested by user, the list may contain information on the availability of the item at the determined locations.

The application 30 presents the user several options to acquire the desired item. One option enables the user to have the desired item delivered at an address of choice. Another option allows the user to travel to the store in order to pick up the item. This opens the possibility to visit several close stores and physically inspect different items before the actual purchase. Related to the store pick up, the application 30 gives the user the option to reserve the item at selected stores for immediate pick up.

Figure 3:
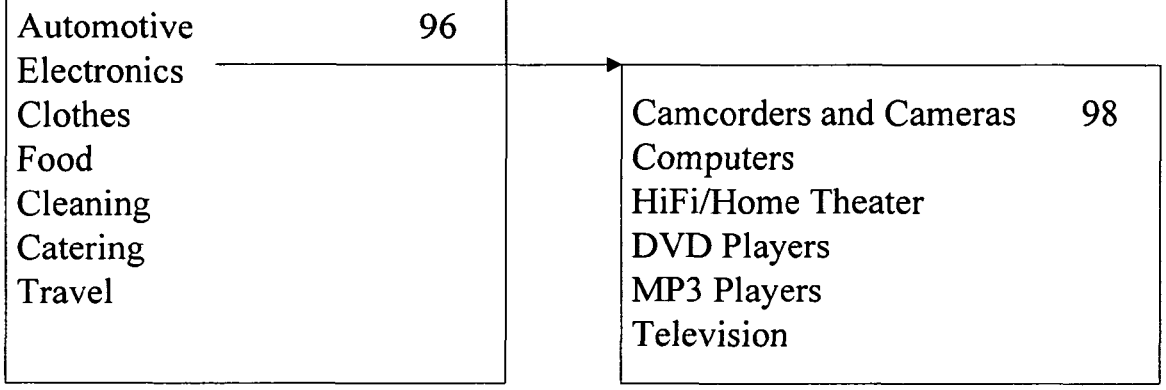
FIG. 3 is a diagram of a query GUI menu.

Referring to FIG. 3, the application 30 (referring back to FIG. 1) presents the user with a template or GUI screen 90 that the user uses to formulate the user query. The GUI includes the fields 92 that give the user the option to either select one of the categories 96 or enter a descriptive text string in the description field 100.

When the user focuses on one of the categories 96, the category expands in a subcategory field 98, which provides a better definition of the desired item. For example, the category "Electronics" expands in the subcategories 98 that limit the selection to several narrower electronics subcategories. The application 30 expands certain categories in several subcategory levels arranged hierarchically. Such a hierarchy of subcategories helps the user to define the item type. For example, the subcategory "Television" (98) may expand into subcategories such as: "Plasma, LCD, CRT, projection." The user selected subcategory appears in the item type field 94. The hierarchically presented item categories and subcategories reflect the contents of the local item specification database 26. The application 30 guides the user in defining the type of the desired item, according to information existent in the database. After the user identifies the desired item type in the category field 94, the application 30 presents the user a subsequent GUI, an example of which is shown in FIG. 4.

If the desired item cannot be associated with any of the categories 92, or specific, uncommon, attributes are desired, the user enters a descriptive string in a field 100. An example of a descriptive string is "multi media device to play music," 102. By accepting descriptive strings as user queries, the application allows the user to initially describe the desired item without specifying many attributes for the type or specify new types that are indexed in the local database.

Referring back to FIGS. 2A, 2B, when the user enters a descriptive string in the field 100, the application 30, may search 38, 40 the local database 26 and/or the web sites 14. The application 30 matches the information provided in the descriptive string to information available in the local database 26 and/or on remote sites 14. As a result of the interactive search 40, the application 30 may adjust 44 the item type definition and re-determines 46 the list of attributes of the desired item. When processing descriptive strings, the application 30 prompts 50 the user with templates or Guls. The application 30 may use the search results to update the local databases (FIG. 1, 26, 28). The updates may add new types of items and new attributes of items.

Whether the user selects subcategories in a template or GUI or enters a descriptive string, as a result, the application 30 may send to the user a new GUI page listing attributes of the desired item.

Referring to FIG. 4, an example of a GUI page 120 that presents the user the list of attributes of a desired item, in this example, a car is illustrated. The text field 124 describes that the field 126 contains the item type. The item type field 126 may already be filled in if the user selected in the starting interface screen exemplified in FIG. 3 a subcategory, in this example, a "car." Several attribute fields 124a, 124b, 124c, 124d, 124e prompt the user to enter attribute values in the corresponding value fields 128a, 128b, 128c, 128d, 128e. The value fields 128a, 128b, 128c, 128d, 128e exemplify possible attribute values of a desired car. By filling in attribute values, the user completes the formulation of the user query. The user profile field 130 may include, as a non limiting example, subfields that prompt the user to enter the target location information and delivery preferences. The "zip code" field 132 indicates the application 30 directly the target location, i.e. around which location to look for stores. The "distance to travel" field 134 tells the application 30 how far the user would travel to pick up the item. The user may restrict the search for stores to a specific area, by specifying a location in the "pick up location" field 136. The "delivery address" field 138 allows the user to have the item shipped at the specified delivery address. The "check availability" check box 138 directs the application 30 to check the inventory at the store sites. The "reserve" check box 140 reserves an item for immediate pick up.

Referring to FIG. 5, two exemplary item specifications (IS) are shown. An IS combines an item type field 200, a list of attributes field 204 and the corresponding attribute values field 206. Regardless of the physical embodiment of an IS, for example in the memory of a computer or on the hard disk of a storage device, the IS contains the three fields 200, 204 and 206. One of the exemplary IS qualifies for a DIS of a car (example A), the other exemplary IS does not qualify for a DIS of a car (example B). The two examples illustrate that a user query determines a IS more or less completely, rendering different degrees of correspondence to a desired item. Thus, the IS of FIG. 5 example A depicts more accurately the item, in this example a car, than the IS of FIG. 5 example B.

As explained, the application 30 parsing (34) may initially not clearly determine the item type and may not parse sufficient item attribute. The application 30 determines item specifications combining the item types, item attributes and item attribute values. An IS qualifies for a DIS if it specifies values for most of the attributes of the corresponding list of attributes of that item, for example for 75 percent of the attributes. A user query formulated by selecting categories/subcategories is expected to result in item specifications that qualify for DIS, an example of which is depicted in FIG. 5 example A that corresponds to the GUI of FIG. 4. A user entered descriptive text string 102 may cause either a search of remote web site 14 (FIG. 1) or an interactive prompt 50 to the user, or both. Thus, a descriptive text string, such as "medium car, 4WD, 100 HP" results in a PS, as exemplified in FIG. 5 example B, which does not qualify for DIS. Consequently, the user is presented 50 (referring back to FIG. 2) a GUI page, as exemplified in FIG. 4. After the user fills in the attributes values, the application 30 determines IS, such as the IS in FIG. 5 example A, which qualifies for a DIS.

Referring to FIG. 6, a result page 150 is presented to the user. The fields 152a, 152b, 152c present the user three desired items that match the user query, items currently available at the selected stores located in the area specified by the user.

A number of embodiments of the invention have been described. Accordingly, other embodiments are within the scope of the following claims. For example, in an alternative embodiment, a supplier/location database is maintained locally, attached directly to the server 20. In another alternative embodiment, the application 30 may be run in the client system 12. Thus, it will be understood that various modifications may be made without departing from the spirit and scope of the invention.

What is claimed is:

1. A computer-implemented method comprising:
    receiving a query from a user, the query having a preliminary item specification containing an item type and a plurality of product attributes that specify features characteristic to a desired item to be searched, the desired item being a product offered for sale by one or more businesses, and each product attribute having a value;
    adjusting the item type of the query when a predefined number of item specifications in an item specification database match at least part of the preliminary item specification;
    determining a list of attributes for the desired item to be searched, the list of attributes for the desired item comprising at least some attributes of the predefined number of item specifications in the item specification database that match at least part of the preliminary item specification, the adjusted item type and the determined list of attributes for the desired item forming a desired item specification for searching for the desired item specified by the query from the user; determining a location of the user; searching the item specification database for products that have specifications having product attributes that match at least a subset of attributes in the desired item specification; and providing information about suppliers that supply the products, wherein the information comprises a distance of the supplier location relative to the location of the user.

2. The computer-implemented method of claim 1, further comprising: if a majority of the attributes in the list of attributes of the desired item specification have not been specified in the query from the user, sending the user a message to reformulate the query.

3. The computer-implemented method of claim 2, wherein the item specification database comprises a local database and remote databases.

4. The computer-implemented method of claim 1 wherein determining a list of attributes of the desired item comprises:
    obtaining a plurality of item specifications from the item specification database; and
    combining attributes of the obtained item specification into the list of attributes of the desired item.

5. The computer-implemented method of claim 4, wherein obtaining a plurality of item specifications comprises searching local databases.

6. The computer-implemented method of claim 4, wherein obtaining a plurality of item specifications comprises searching remote databases.

7. The computer-implemented method of claim 4, wherein obtaining a plurality of item specifications comprises searching websites over the Internet.

8. The computer-implemented method of claim 1, wherein determining the location of the user comprises obtaining a physical address from the user.

9. The computer-implemented method of claim 1, wherein providing the information about suppliers comprises
    linking each product having specifications that match at least a subset of the desired item specification with a supplier from a supplier database.

10. The computer-implemented method of claim 9, further comprising maintaining the supplier database.

11. The computer-implemented method of claim 10, wherein maintaining the supplier database comprises removing information of suppliers that become unavailable or that are not reliable.

12. The computer-implemented method of claim 9, wherein the supplier database is local with the item specification database.

13. The computer-implemented method of claim 12, further comprising updating the supplier database and the item specification database based on use of the supplier database and the item specification database associated with the query from the user.

14. The computer-implemented method of claim 13, wherein updating the supplier database and the item specification database comprises updating the item specifications in the item specification database.

15. The computer-implemented method of claim 9, wherein the supplier database is located at, and maintained by, a third party server.

16. The computer-implemented method of claim 1, wherein providing information about suppliers comprises searching for suppliers on remote websites.

17. A non-transitory machine-readable medium storing instructions that are executable by a processing device to cause the processing device to perform operations comprising:

receiving a query from a user, the query having a preliminary item specification containing an item type and a plurality of product attributes that specify features characteristic to a desired item to be searched, the desired item being a product offered for sale by one or more businesses, and each product attribute having a value;

adjusting the item type of the query when a predefined number of item specifications in an item specification database match at least part of the preliminary item specification;

determining a list of attributes for the desired item to be searched, the list of attributes for the desired item comprising at least some attributes of the predefined number of item specifications in the item specification database that match at least part of the preliminary item specification, the adjusted item type and the determined list of attributes for the desired item forming a desired item specification for searching for the desired item specified by the query from the user;

determining a location of the user;

searching the item specification database for products that have specifications having product attributes that match at least a subset of the desired item specification; and providing information about suppliers that supply the products, wherein the information comprises a distance of the supplier location relative to the user's location.

18. The non-transitory machine-readable medium of claim 17, wherein the instructions are executable by the processing device to cause the processing device to perform operations comprising:

if a majority of the attributes of the list of attributes of the desired item have not been specified in the query from the user, sending the user a message to reformulate the query.

19. The non-transitory machine-readable medium of claim 15, wherein providing information about suppliers comprises searching for suppliers on remote websites.

20. The non-transitory machine-readable medium of claim 17, wherein the item specification database comprises a local database and remote databases.

21. The non-transitory machine-readable medium of claim 17, wherein determining the list of attributes for the desired item comprises:

obtaining a plurality of item specifications from the item specification database; and combining attributes of the obtained item specifications into the list of attributes of the desired item.

22. The non-transitory machine-readable medium of claim 21, wherein obtaining a plurality of item specifications comprises searching local databases.

23. The non-transitory machine-readable medium of claim 21, wherein obtaining a plurality of item specifications comprises searching remote databases.

24. The non-transitory machine-readable medium of claim 21, wherein obtaining a plurality of item specifications comprises searching websites over the Internet.

25. The non-transitory machine-readable medium of claim 17, wherein determining the location of the user comprises obtaining a physical address from the user.

26. The non-transitory machine-readable medium of claim 17, wherein the instructions are executable by the processing device to cause the processing device to perform operations comprising:

linking each product having specifications that match at least a subset of the desired item specification with a supplier from a supplier database.

27. The non-transitory machine-readable medium of claim 26, wherein the instructions are executable by the processing device to cause the processing device further to maintain the supplier database.

28. The non-transitory machine-readable medium of claim 27, wherein maintaining the supplier database comprises removing information of suppliers that become unavailable or that are not reliable.

29. The non-transitory machine-readable medium of claim 26, wherein the supplier database is local to the item specification database.

30. The non-transitory machine-readable medium of claim 29, wherein the instructions are executable by the processing device to update the supplier database and the item specification database based on use of the supplier database and the item specification database associated with the query from the user.

31. The non-transitory machine-readable medium of claim 30, wherein updating the supplier database and the item specification database comprises updating the item specifications in the item specification database.

32. The non-transitory machine-readable medium of claim 26, wherein the supplier database is located at, and maintained by, a third party partner's server.

* * * * *

UNITED STATES PATENT AND TRADEMARK OFFICE
CERTIFICATE OF CORRECTION

| | | |
|---|---|---|
| PATENT NO. | : 8,046,375 B2 | Page 1 of 1 |
| APPLICATION NO. | : 11/153980 | |
| DATED | : October 25, 2011 | |
| INVENTOR(S) | : Steven Quince | |

It is certified that error appears in the above-identified patent and that said Letters Patent is hereby corrected as shown below:

Column 9, Line 5:

Delete "party server" and insert --party partner's server--

Column 9, Line 47-48:

Delete "claim 15," and insert --claim 18--

Signed and Sealed this
Fourteenth Day of August, 2012

David J. Kappos
*Director of the United States Patent and Trademark Office*